(12) United States Patent
Kogan et al.

(10) Patent No.: US 7,631,257 B2
(45) Date of Patent: Dec. 8, 2009

(54) CREATION AND MANAGEMENT OF CONTENT-RELATED OBJECTS

(75) Inventors: Daniel E. Kogan, Issaquah, WA (US); Patrick C. Miller, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 10/941,549

(22) Filed: Sep. 15, 2004

(65) Prior Publication Data

US 2006/0059465 A1 Mar. 16, 2006

(51) Int. Cl.
G06F 17/00 (2006.01)
(52) U.S. Cl. .................. 715/239; 707/203; 717/122
(58) Field of Classification Search .............. 707/10, 707/100, 103, 200, 203; 715/234, 239; 717/122
See application file for complete search history.

(56) References Cited

U.S. PATENT DOCUMENTS

| | | | | | |
|---|---|---|---|---|---|
| 5,897,636 | A | * | 4/1999 | Kaeser | 707/100 |
| 6,026,433 | A | * | 2/2000 | D'Arlach et al. | 709/217 |
| 6,366,933 | B1 | * | 4/2002 | Ball et al. | 715/203 |
| 6,486,895 | B1 | * | 11/2002 | Robertson et al. | 715/776 |
| 2003/0110449 | A1 | * | 6/2003 | Wolfe | 715/522 |

FOREIGN PATENT DOCUMENTS

WO WO 99/18522 * 4/1999

WO WO 01/33435 A1 * 5/2001

OTHER PUBLICATIONS

Belotti et al; "Interplay of Content and Context"; ICWE 2004; pp. 187-200; Institute for Information Systems, ETH Zurich.
Troyer; "Designing Well-Structured Websites: Lessons to Be Learned from Database Schema Methodology"; 1998; pp. 51-64; Tilburg University.
Barta et al.; "Jessica: an object-oriented hypermedia publishing processor"; 1998; pp. 281-290.
Couderc et al.; "Improving Level of Service for Mobile Users Using Context-Awareness"; 1999 IEEE.
Mehta, Alok et al., "The Content Manager: A Tool to Develop Multilingual and Multi-Preference Web Sites" *IEEE* 2001 (10 pages).
Nadamoto, Akiyo, et al. "Concurrent Browsing of Bilingual Web Sites By Content- Synchronization and Difference- Detection" *IEEE* 2003 (13 pages).
Ricca, Filippo, et al. "Experimental Results on the Alignment of Multilingual Web Sites" *IEEE* 2004 (10 pages).

* cited by examiner

*Primary Examiner*—Cheyne D Ly
(74) *Attorney, Agent, or Firm*—Mercahnt & Gould; Ryan T. Grace

(57) ABSTRACT

A web content management server allows for the automatic creation, management and publication of variant objects from a parent object. The variant object is created as a copy of the corresponding parent object and may then be modified. Each object includes a pages list that identifies all associated objects and the content type of each object listed in the pages list. The relationship between parent and variant objects is maintained regardless of the location where the objects are stored. When changes are made to the parent page, the changes are also implemented in any corresponding variant pages. The parent object tracks any corresponding variant objects with an identifier stored in the pages list. When the parent page is modified, a workflow is triggered to modify the corresponding variant pages identified by the identifier and the content type in the pages list.

12 Claims, 6 Drawing Sheets

*Fig. 4*

CREATION AND MANAGEMENT OF CONTENT-RELATED OBJECTS

BACKGROUND OF THE INVENTION

Web content can be made available through different sites that are targeted at specific audiences. The audience may vary over a given set of characteristics such as language, browsing devices, company affiliation, or authorization level in an information value chain. Maintaining the relationships that transform content, pages, and navigation into sites targeted at different audience characteristics is difficult and expensive. As the number of variations that are supported increases, the cost and complexity of maintaining all of the relationships between each variation increases significantly. When a change is made to an entity, the system does not automatically institute the necessary changes. Routine modifications such as deletions or matching site navigation must be done manually for each site variation.

SUMMARY OF THE INVENTION

A web content management server allows for the automatic creation, management and publication of variant objects from a parent object. The variant object is created as a copy of the corresponding parent object and may then be modified. Each object is identified by the type of content included in the object. The content type of a variant object is the same as the content type of the corresponding parent object. Each object includes a pages list that identifies all associated objects and the content type of each object listed in the pages list. The pages list is used to create and maintain the relationship between an object and any corresponding parent and variant objects. The relationship between parent and variant objects is maintained regardless of the location where the objects are stored. When changes are made to the parent page, the changes are also implemented in any corresponding variant pages. The parent and variant objects are continually mirrored to account for modified and newly created objects. The parent object tracks any corresponding variant objects with an identifier stored in the pages list. When the parent page is modified, a workflow is triggered to modify the corresponding variant pages identified by the identifier and the content type in the pages list.

BRIEF DESCRIPTION OF THE DRAWINGS

FIG. 4 is a screen shot illustrating a settings page for managing parent and variant objects in a multi-lingual site, in accordance with the present invention.

DETAILED DESCRIPTION OF THE PREFERRED EMBODIMENT

Briefly stated, a method and system for managing content-related objects are described. A web content management server allows for the automatic creation, management and publication of variant objects from a parent object. Examples of objects include web pages, and area or sub-areas within a web site. The variant object is created as a copy of the corresponding parent object. The variant object may then be stored in the same location as the parent object or in a different area. The variant object is identified by a tag to associate the variant with the corresponding parent. After the variant object is created it may then be modified to address a specific purpose, i.e., targeting a specific audience.

Each object is identified by the type of content included in the object. Examples of types of content for a web page can include home, news, contact information, calendar, frequently asked questions (FAQs), etc. The content type of a variant object is the same as the content type of the corresponding parent object. The content type of a variant object is determined when the variant object is created. For example, a parent page in a news area of a web site is identified as having a news content type. Thus, a corresponding variant page is also identified as having a news content type.

Each object includes a pages list that identifies all associated objects. The pages list also identifies the content type of each object listed in the pages list. The pages list is used to create and maintain the relationship between an object and any corresponding parent and variant objects. The relationship between parent and variant objects is maintained regardless of the location where the objects are stored. In other words, the parent page is aware of the existence and location of its variant page even if the variant page is renamed or moved to several different locations. When changes are made to the parent page, the changes are also implemented in any corresponding variant pages. The parent and variant objects are continually mirrored to account for modified and newly created objects.

The parent object tracks any corresponding variant objects with an identifier stored in the pages list. When the parent page is modified, a workflow is triggered to modify the corresponding variant pages identified by the identifier and the content type in the pages list.

Illustrative Operating Environment

Figure 1:
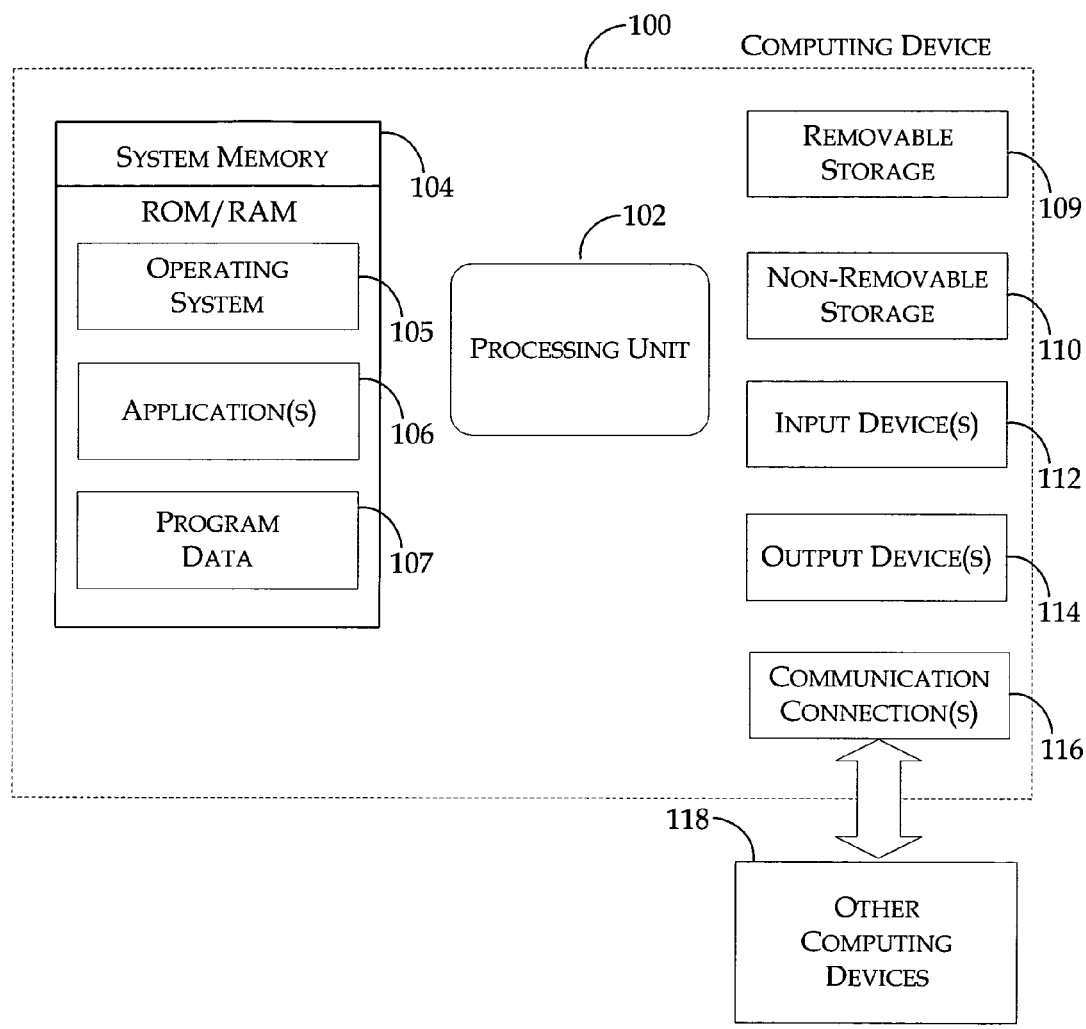
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. The present invention, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Automatically Creating and Managing Content-Related Objects

Figure 2:
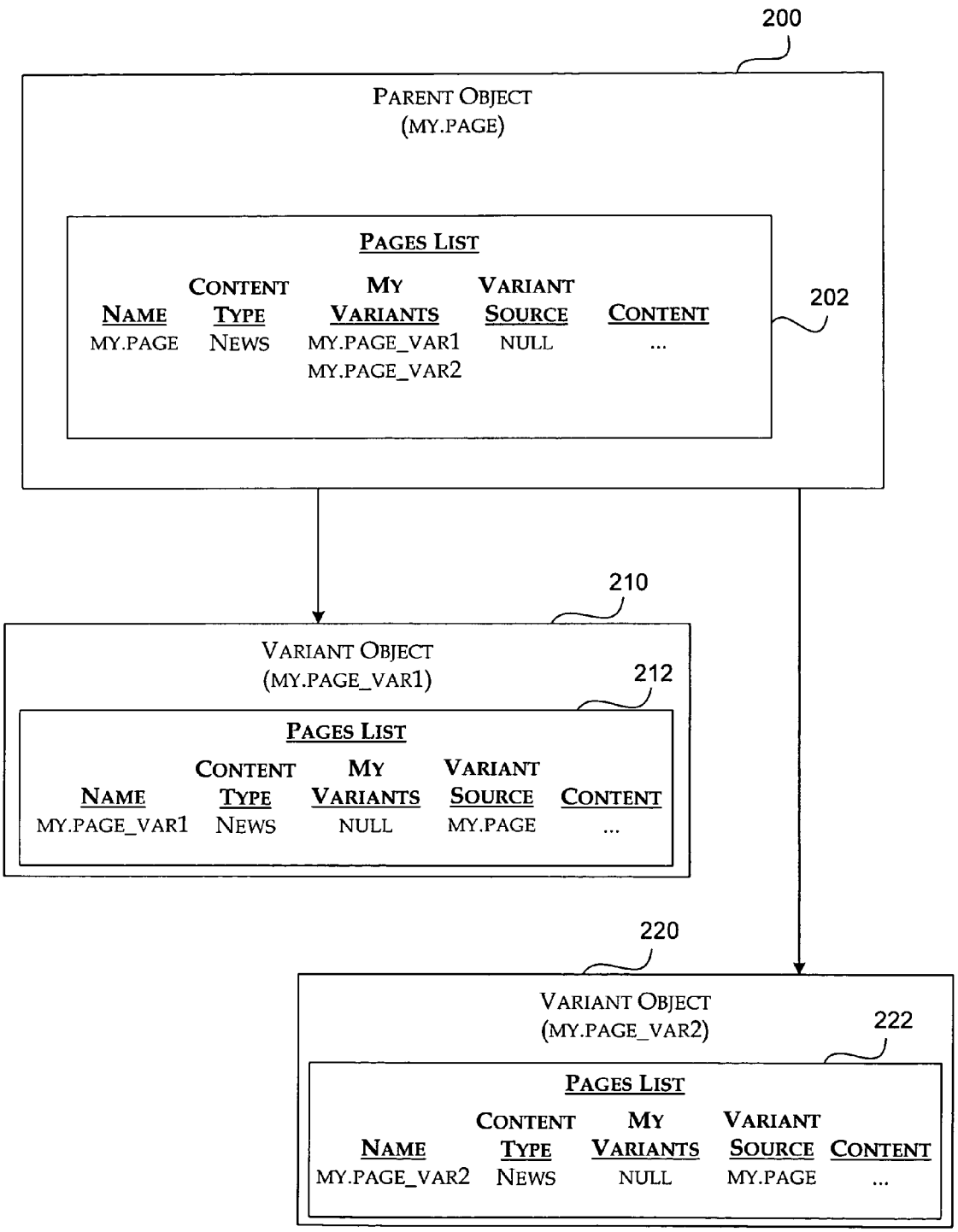
FIG. 2 is a functional block diagram illustrating a system for managing content-related objects, in accordance with the present invention.

FIG. 2 is a functional block diagram illustrating a system for automatically creating and managing content-related objects, in accordance with the present invention. Types of objects include pages, areas, or sub-areas in a web site structure. An object may be a parent object 200 or a variant object 210, 220. Variant objects 210, 220 are created from parent object 200 by copying the data in parent object 200 and storing the data in variant object 210, 220.

Variant page 210 may be identified by a tag associated with the corresponding parent object. For example, parent object 220 is identified as "my.page". Thus, variant page 210 may be identified as "my.page_var1" and variant page 220 may be identified as "my.page_var2".

After variant object 210, 220 is created a workflow may be initiated to convert variant object 210, 220 into a different form. For example, variant object 210, 220 may be transformed to address a specific purpose that parent object 200 does not, i.e., targeting a specific audience. In one embodiment, variant object 210, 220 may be transformed to support multilingual sites associated with a parent site such that variant objects 210, 220 are converted into languages different than parent object 200. In another embodiment, parent object 200 may be compatible with a particular computer application and variant objects 210, 220 may be transformed to be compatible with other applications. In another embodiment, variant object 210, 220 may be transformed to support devices and branded sites that parent object 200 does not. The invention will be described with reference to parent and variant objects associated with multilingual sites. However, it is understood that the present invention can be used to manage any variant/parent object relationship.

After variant object 210, 220 is created it is stored in a particular location. In one embodiment, a parent area may have a corresponding variant area where the variant object can be stored. Thus, the variant object is stored in the variant area in the same location where the corresponding parent object is stored in the parent area. Using the multilingual site example, an English area may have an associated French area that includes French variant pages corresponding to the English parent pages. If a corresponding variant area does not exist, the variant area may be created in an appropriate location. The variant object is then stored in the newly created variant area.

In another embodiment, variant object 210 may be renamed and stored in a location other than the location established by parent object 200. For example, a Japanese variant object named "my.page_jap" is created from an English parent object "my.page". The variant object is in a location in a Japanese area that corresponds to the location of the object in the English area. The manager of a Japanese language site could rename the variant object and then store the variant object in a different area of the Japanese site without affecting the structure of the English site.

The relationship between parent object 200 and variant objects 210, 220 is maintained even though the name of variant object 210, 220 and its stored location may have changed. Parent object 200 remains unaffected if variant object 210 is deleted. For example, a French page may be created as a variant of a parent page on an English site. The manager of the French site may delete the French page without affecting the English parent page. Thus, the parent and variant site structures are not required to be symmetrical.

A specific number of variant areas may be established within a site structure. After a number of variant objects are created and stored in the corresponding areas, an additional variant area may be established by automatically generating the structure of the new area. For example, an English parent area may have three symmetrical variant areas (e.g., French, German, Japanese). After a period of time, an Italian area may be added that corresponds to the established areas. The Italian area is not created to be symmetrical with the established areas, i.e., every page that exists in the other areas is not created in the Italian area. Instead, every subsequent object that is created in the parent area is copied in the corresponding locations of the three symmetrical areas and in the Italian area.

When changes are made to parent object 200, the changes may also be implemented in corresponding variant objects 210, 220. Variant objects 210, 220 continually mirror parent object 200 to account for additions, modifications, and/or deletions to parent object 200. For example, every time a new area is created in a parent site, a corresponding variant of the new area is automatically created in the corresponding variant site.

Each object is identified by the type of content (i.e., schema) included in the object. Examples of types of content include home, news, contact information, calendar, FAQs, and the like. The content type of variant object 210 is determined when variant object 210 is created from parent object

200. For example, parent object 200 may be a page in a news area of a web site. Thus, parent object 200 is identified as having a news content type. Variant objects 210, 220 created from the parent news page are also identified as having a news content type. In one embodiment, the content type is identified using a metadata value associated with the object.

Each object includes a pages list 202, 212, 222. Pages list 202, 212, 222 identifies the object that the parent list is associated with, the content type of the object, any variant and/or parent objects associated with the object, and the contents of the object. For example, pages list 202 identifies object 200 (my.page) and the associated variant objects 210, 220 (my.page_var1, my.page_var2). Likewise, pages list 212 identifies object 210 (my.page_var1) and the associated parent object 200 (my.page). Pages lists 202, 212, 222 maintain the relationship between parent object 200 and variant objects 210, 220.

Variant objects 210, 220 remain associated with parent object 200 regardless of the location of the objects within the site structure. Parent object 200 tracks variant objects 210, 220 with an identifier. In one embodiment, the identifier is identifying metadata such as a globally unique identifier (GUID). Likewise, variant objects 210, 220 track corresponding parent object 200 with an identifier. In one embodiment, the GUID is stored in the pages list. When parent object 200 is modified, a workflow is triggered to modify variant objects 210, 220. The workflow implements the GUID to locate and modify variant objects 210, 220.

Variant object 210 may have an associated work flow or access point independent of other objects. The maintained relationship between variant and parent objects ensures that when parent object 200 is modified a work flow is configured to implement any necessary changes to variant object 210. The workflow manipulates the data copied from parent object 200 and stores the modified data as variant object 210. For example, a translation-specific workflow is triggered when a variant object is created on a multi-lingual site. The translation-specific workflow converts the content of the parent object into a language associated with the variant site such that the variant object is a translated version of the parent object. The translation-specific workflow may be executed differently depending on the language to be translated. For example, one language may be translated within the operating system of the computing environment, while another translation may be performed by submitting an extensible mark-up language (XML) package to a translation vendor.

Figure 3:
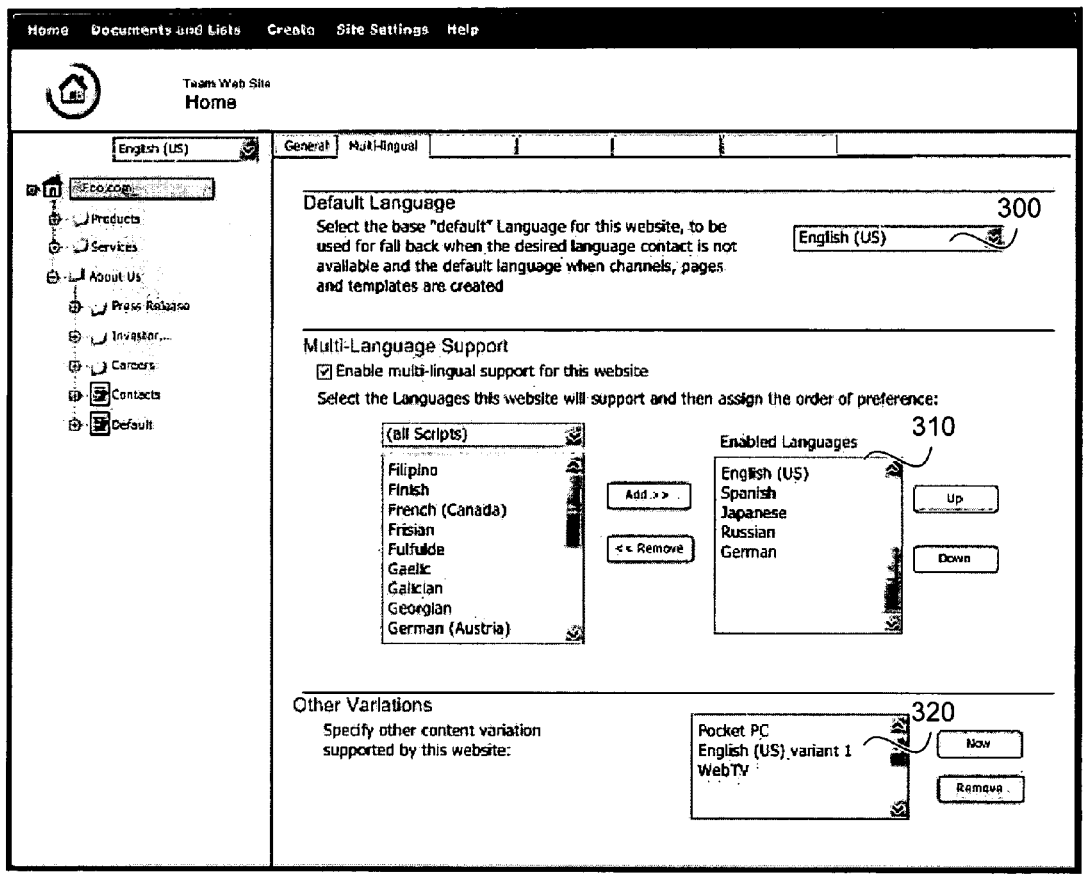
FIG. 3 is a screen shot illustrating a settings page for managing parent and variant objects in a multi-lingual site, in accordance with the present invention.

FIG. 3 is a screen shot illustrating a settings page for managing parent and variant objects in a multi-lingual site. A web site manager may establish a default language 300 and enabled languages 310 supported by a web site. Other variations 320, such as supporting other applications or variations within the same language, may also be established. Many server and client operating systems are designed to support several languages. Thus, default language 300 may be different than the language associated with the underlying operating system or the language associated with the software that supports the web site. In one embodiment, the default language is the language that is primarily used by the users who access the web site. For example, if the web site is confined to a business enterprise, the default language may be selected to accommodate the largest number of employees within the business.

Enabled languages 310 are selected to accommodate users that prefer to navigate the site in a language other than default language 300. For example, the user may not understand default language 300, the user may prefer to navigate the site in their native tongue, or the user may desire to improve their understanding of a new language. In one embodiment, enabled languages 310 may be changed as business requirements change.

Figure 4:
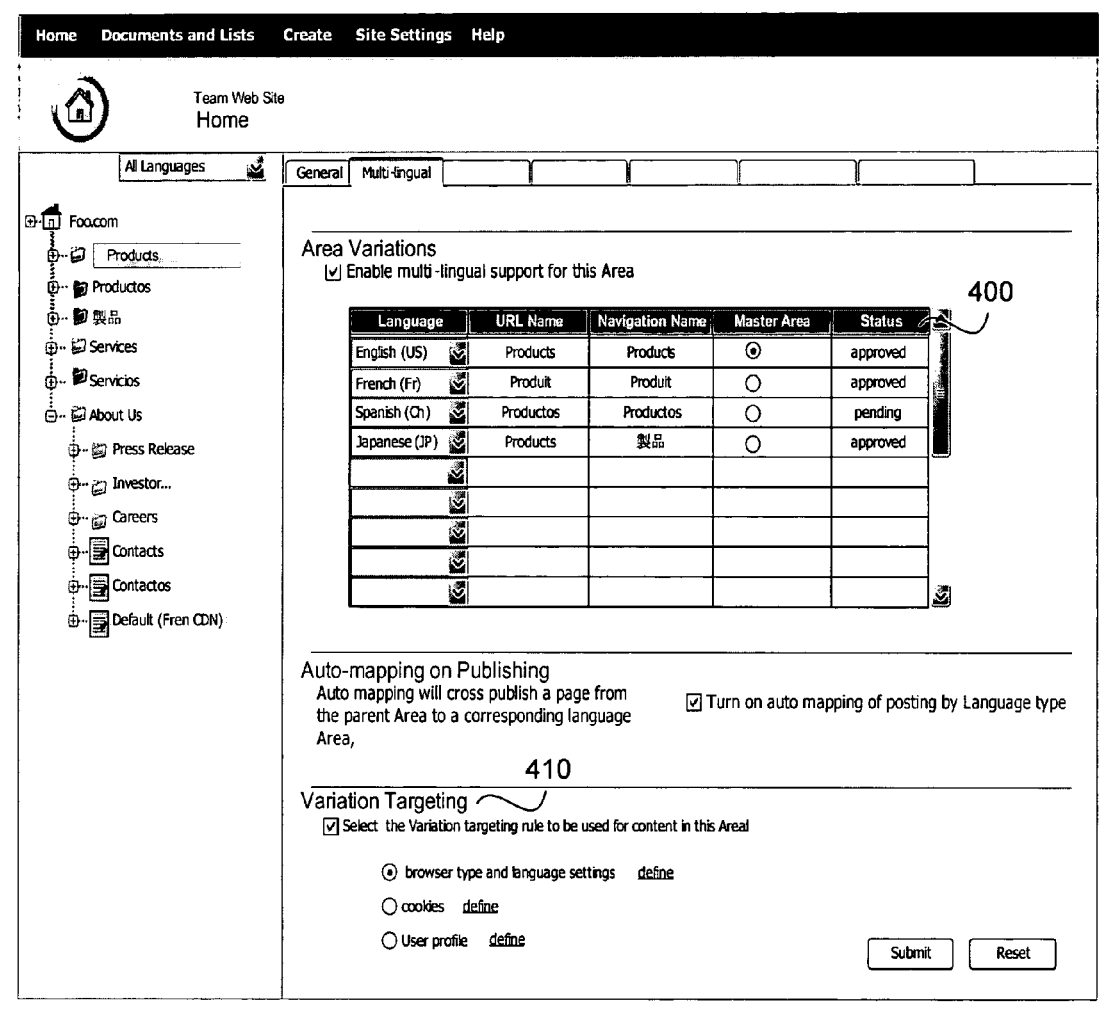

FIG. 4 is a screen shot illustrating a settings page for managing parent and variant objects in a multi-lingual site. The default and enabled languages established by the web site manager are enumerated to the user as a list of available variant pages. For example, when a user navigates to an English website, a list of other languages that the page is available in may appear as menu 400. Thus, the user is informed that English is the default language and three variant pages associated with the parent English page are available in the enabled languages (e.g., French, Spanish, Japanese). The user may then select a page to view in one of the three enabled languages.

A web site manager may establish a variation targeting rule 410 to define behavior associated with navigating to a variant object. The variation targeting rule may be used to define default scenarios when a particular variant object is not available.

For example, a variation targeting rule may be established such that if a variant object does not exist the variant object is not listed on a menu and the user is navigated to the corresponding parent page or to a virtual root of the requested page.

The variation targeting rule may also be used to navigate the user to a specific location based on the settings established by the web site manager. For example, when a user is at an English page and selects the corresponding French variant, the user may be navigated directly to the French variant page. Alternatively, the user may be navigated to a different French page (e.g., virtual root, home, news, default page, etc.). The user then traverses the French site to locate the desired page.

Figure 5:
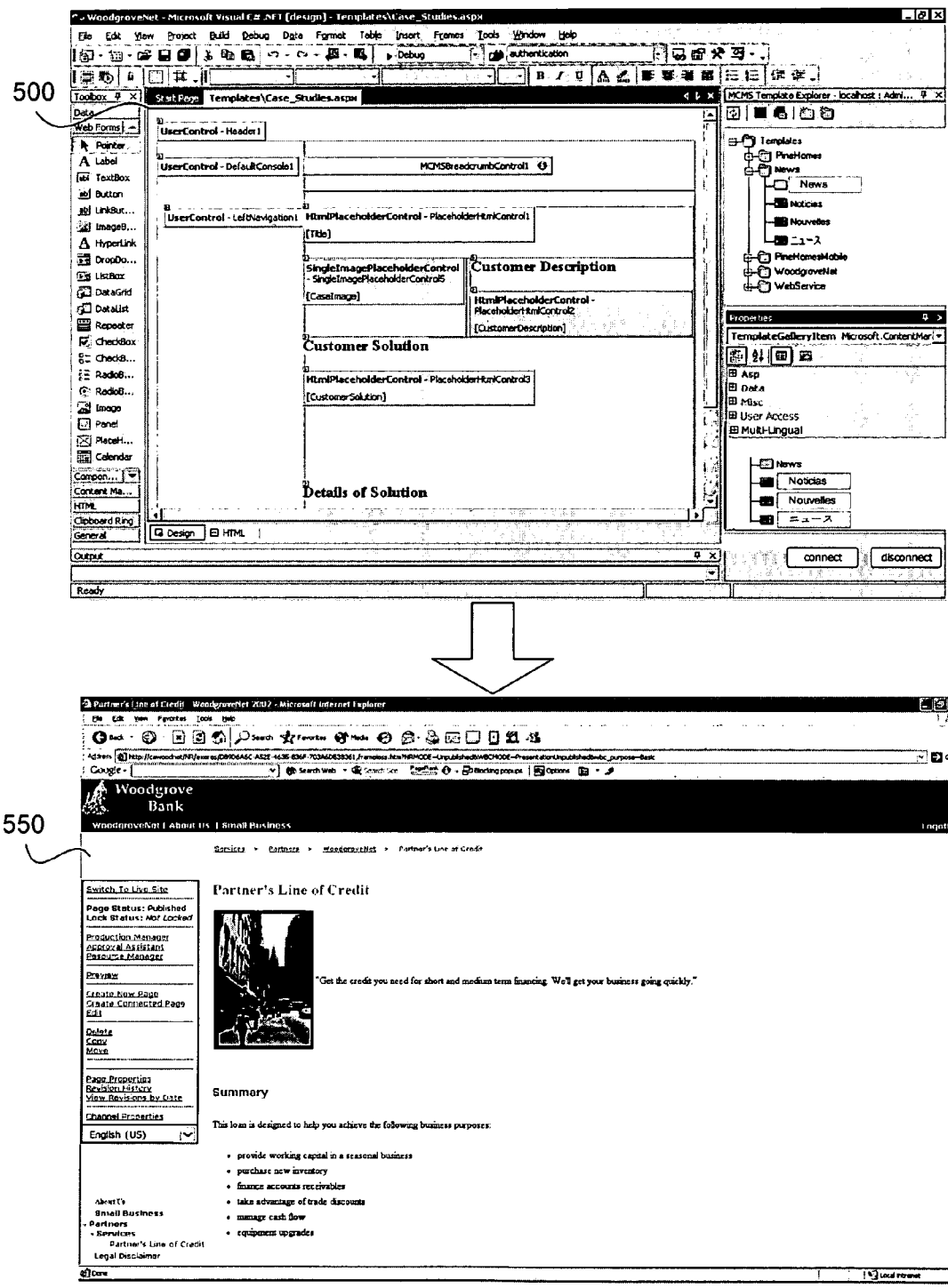
FIG. 5 shows two screen shots illustrating a template and a web page configured by the template, in accordance with the present invention.

FIG. 5 shows two screen shots illustrating a template 500 and a web page 550 configured by template 500. The presentation and layout of the content of an object may be configured by a template. One template may be used for related parent and variant objects because the objects are related by content type. For example, language-specific template settings may establish formatting restrictions prohibiting the use of a particular text format or font. Even though the template is language-specific, the formatting restrictions are independent of language because the objects are related by content type rather than language.

In one embodiment, multi-lingual support may be enabled for an English template. A generic template used for the parent object may be also used for a variant object. For example, German and French variant objects may share the same template as the parent English object because the languages rely on the same basic features (e.g., same character set, read from left to right, etc.) However, a newly generated variant object may require a different template than its parent page. For example, a variant Japanese object created from the parent English object may require a different template associated with it because the character set and layout of the object may be different than the parent object. Thus, the Japanese variant object is displayed in accordance with a specialized template. The specialized template may be explicitly tagged for a particular variant object at the location where the variant object is stored.

A particular content type may be associated with many different templates. The template may include a tag that identifies the particular content type. Thus, a variant object may be created in an area identified by the tag. For example, a newly created object identified by a Japanese tag may be stored in a corresponding Japanese area. The content type of the Japanese object remains the same as the content type of the parent object from which the variant object was created.

Related templates may be tracked by the same information that is used to identify related objects. Language templates may be directly associated with the parent template, or through a variant template associated with the parent template. The association permits the identification of the correct template from which to automatically create variant objects. For example, a French variant page of a German events page ("german.events") is created in a French area that corresponds to the German area. The French variant page is created using a French template associated with the German events template. The new French variant page may be named "german.events_frn" such that it maintains a relationship with the corresponding German page.

The difference in templates is not dependent solely on language. For example, an English language page directed to an American target audience may use a template different than the template used for a variant of the page tagged for a British or Australian target audience. The template may account for differences in regional colloquialisms, slang, layout, branding, and look-and-feel.

Other template settings may be configured to establish a default language, require confirmation before variant objects are created, and create second degree variant objects such that the variant object of a parent object may also be a parent object to another variant object.

Figure 6:
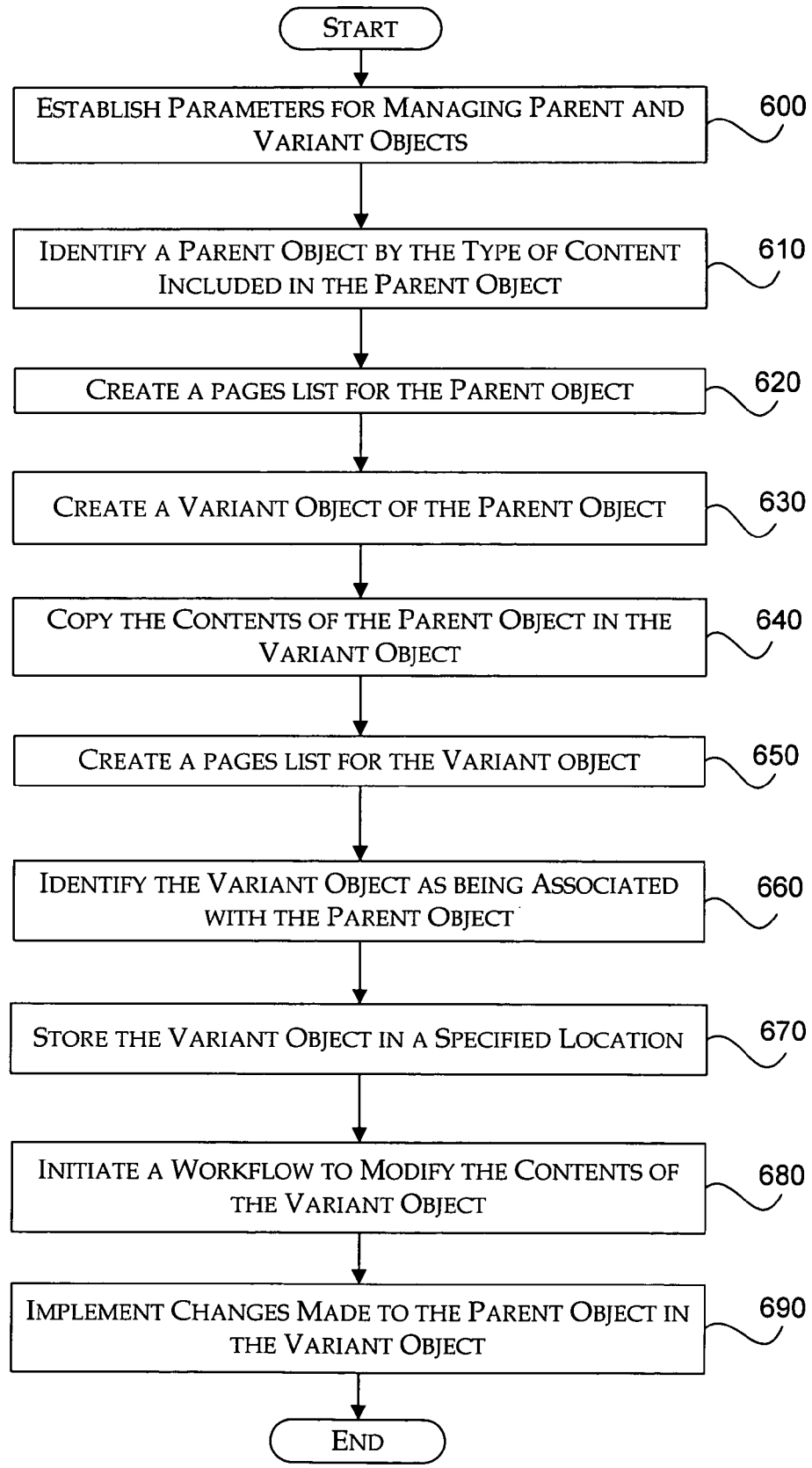
FIG. 6 is an operational flow diagram illustrating a process for managing content-related objects, in accordance with the present invention.

FIG. 6 is an operational flow diagram illustrating a process for creating and managing content-related objects. The process begins at a start block where an object is stored in a computing environment. The object may be a web page, or an area or sub-area within a web site.

Moving to block 600, parameters are established for managing parent and variant objects. Parameters may include the languages supported by a web site, or applications/devices supported by an operating system. A parameter may also be a variation targeting rule that defines behavior associated with navigating to a variant object. In one embodiment, the variation targeting rule defines default scenarios when a variant object is not available.

Proceeding to block 610, a parent object is identified by the type of content included in the parent object. Examples of types of content for a web page can include home, news, contact information, calendar, and FAQs. In one embodiment, the content type is identified using a metadata value associated with the object. In another embodiment, templates used for presentation and layout of the objects may be related by content type such that related objects may use the same template when the content of the objects is presented on-screen.

Advancing to block 620, a pages list is created for the parent object. The pages list identifies all of the objects associated with the parent object. The pages list provides information about any related variant objects and any objects that the parent object may have been created from, i.e., grandparent objects. The pages list also identifies the content type of each object listed in the pages list. Each object in the pages list is identified by a unique identifier such that the objects can track any corresponding parent/variant objects regardless of where the parent/variant objects are stored or what the parent/variant objects are named. In one embodiment, the identifier is metadata such as a GUID. In one embodiment, when a user accesses an object, the pages list may be used to provide the user with a list of objects related to the accessed object. For example, the user may access a parent object. The pages list of the parent object is then accessed to present the user with a list of available variant objects associated with the parent object.

Transitioning to block 630, a variant object is created from the parent object and has the same content type as the parent object from which it was created. The content type of the variant object is determined when the variant object is created. Moving to block 640, the contents of the parent object are copied and stored in the variant object.

Continuing to block 650, a pages list is created for the variant object. As discussed above, the pages list identifies the parent object, the parent object's content type, and the parent object's identifier. The relationship between the parent and variant objects is maintained by the pages lists.

Processing proceeds to block 660 where the variant object is identified such that it is associated with the parent object. In one embodiment, the variant object is identified by a tag such as a suffixed filename (filename_var).

Moving to block 670, the variant object is stored in a specified location. The location may be in the same area as the parent object, or the variant object may be stored in a location in variant area that corresponds to the location in where the parent object is stored in a parent area.

Proceeding to block 680, a workflow is initiated to modify the contents of the variant object. In one embodiment, the workflow is initiated when the variant object is created to modify the variant object to address a specific purpose, e.g., to target a specific audience. For example, since the variant object is created as a copy of the parent object, a translation workflow can be initiated to convert the language in the variant object to a different language.

Advancing to block 690, any changes made to the parent object are implemented in the variant object. The variant object is located using the pages list of the parent object. In one embodiment, the variant object is located using the corresponding identifier listed in the pages list of the parent object. In one embodiment, a workflow is initiated when the parent object is modified such that the modification may also implemented in the variant object. The parent and variant objects are continually mirrored to account for any deleted, modified or newly created objects. In one embodiment, a deleted variant object does not affect the corresponding parent object. Processing then terminates.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for automatically creating and managing content-related webpages, comprising:

generating a parent webpage, wherein the parent webpage includes a pages list stored with the parent webpage, wherein the pages list includes a variant container and a source container, wherein upon generating the parent webpage setting the source container to null;

generating a variant webpage of the parent webpage by forming a copy of the parent webpage, wherein the variant webpage includes a pages list stored with the variant webpage, wherein the pages list of the variant webpage includes a variant container and a source container, wherein upon generation of the variant webpage, populating the source container of the pages list of the variant webpage with an identifier of the parent webpage and populating the variant container of the pages list of the parent webpage with an identifier of the variant webpage;

upon receiving a modification to the parent webpage, causing a computer processor to access the pages list of the parent webpage to obtain the identifier of the variant webpage located in the variant container of the pages list of the parent webpage;

locating the variant webpage via the obtained identifier; and causing the computer processor to automatically populate the received modification to the variant webpage based on the obtained identifier.

2. The computer-implemented method of claim 1, further comprising initiating a workflow to convert the variant webpage to a form different than the parent webpage.

3. The computer-implemented method of claim 1, wherein the variations of the parent webpage are selected by a web site manager.

4. The computer-implemented method of claim 1, wherein the parent webpage includes parameters having at least one of a group comprising: languages supported by a web site, applications supported by an operating system, devices supported by an operating system and a variation targeting rule that establishes behavior associated with accessing the variant webpage.

5. The computer-implemented method of claim 1, further comprising displaying the variant webpage in accordance with a template associated with the parent webpage, wherein the template is related to the variant webpage by a content type identifier of the pages list of the parent webpage.

6. A system for automatically creating and managing content-related webpages, comprising a web content configuration server being configured to:

generating a parent webpage, wherein the parent webpage includes a pages list stored with the parent webpage, wherein the pages list includes a variant container and a source container;

generating a variant webpage of the parent webpage by forming a copy of the parent webpage, wherein the variant webpage includes a pages list stored with the variant webpage, wherein the pages list of the variant webpage includes a variant container and a source container, wherein upon generation of the variant webpage, populating the source container of the pages list of the variant webpage with an identifier of the parent webpage and populating the variant container of the pages list of the parent webpage with an identifier of the variant webpage;

upon receiving a modification to the parent webpage, accessing the pages list of the parent webpage to obtain the identifier of the variant webpage located in the variant container of the pages list of the parent webpage;

locating the variant webpage via the obtained identifier; and automatically populating the received modification to the variant webpage based on the obtained identifier.

7. The system of claim 6, wherein a content type identifier is included in metadata corresponding to the parent webpage.

8. The system of claim 6, wherein a workflow is initiated to convert the variant webpage to a form different than the parent webpage.

9. The system of claim 6, wherein the variant webpage is displayed in accordance with a template associated with the parent webpage, and wherein the template is related to the variant webpage by a content type identifier of the pages list of the parent webpage.

10. A computer-readable storage medium having computer-executable instructions for automatically creating and managing content-related webpages, comprising:

generating a parent webpage, wherein the parent webpage includes a pages list stored with the parent webpage, wherein the pages list includes a variant container and a source container;

generating a variant webpage of the parent webpage by forming a copy of the parent webpage, wherein the variant webpage includes a pages list stored with the variant webpage, wherein the pages list of the variant webpage includes a variant container and a source container, wherein upon generation of the variant webpage, populating the source container of the pages list of the variant webpage with an identifier of the parent webpage and populating the variant container of the pages list of the parent webpage with an identifier of the variant webpage;

upon receiving a modification to the parent webpage, accessing the pages list of the parent webpage to obtain the identifier of the variant webpage located in the variant container of the pages list of the parent webpage;

locating the variant webpage via the obtained identifier; and automatically populating the received modification to the variant webpage based on the obtained identifier.

11. The computer-readable storage medium of claim 10, further comprising initiating a workflow to convert the variant webpage to a form different than the parent webpage.

12. The computer-readable storage medium of claim 10, further comprising displaying the variant webpage in accordance with a template associated with the parent webpage, wherein the template is related to a content type identifier of the pages list of the parent webpage.

* * * * *